(12) United States Patent
Ferreira et al.

(10) Patent No.: US 9,540,095 B2
(45) Date of Patent: Jan. 10, 2017

(54) AERODYNAMIC SURFACE DRIVE MECHANISM

(71) Applicant: EMBRAER S.A., São José dos Campos (BR)

(72) Inventors: Clóvis Augusto Eça Ferreira, São José dos Campos (BR); Israel Da Silva, São José dos Campos (BR)

(73) Assignee: EMBRAER S.A., São José Dos Campos-SP (BR)

( * ) Notice: Subject to any disclaimer, the term of this patent is extended or adjusted under 35 U.S.C. 154(b) by 99 days.

(21) Appl. No.: 14/495,680

(22) Filed: Sep. 24, 2014

(65) Prior Publication Data

US 2015/0083854 A1   Mar. 26, 2015

(30) Foreign Application Priority Data

Sep. 24, 2013   (BR) .............................. 102013024469

(51) Int. Cl.
| | |
|---|---|
| *B64C 3/38* | (2006.01) |
| *B64C 5/10* | (2006.01) |
| *B64C 9/00* | (2006.01) |
| *B64C 13/00* | (2006.01) |
| *B64C 13/28* | (2006.01) |

(Continued)

(52) U.S. Cl.
CPC ................. *B64C 13/28* (2013.01); *B64C 9/02* (2013.01); *B64C 9/16* (2013.01); *Y02T 50/32* (2013.01); *Y02T 50/44* (2013.01)

(58) Field of Classification Search
CPC .............. B64C 13/28; B64C 9/02; B64C 9/04; B64C 9/16
See application file for complete search history.

(56) References Cited

U.S. PATENT DOCUMENTS 2,700,516 A * 1/1955 Nazir ...................... B64C 9/146
244/212
4,283,029 A * 8/1981 Rudolph ................... B64C 9/16
244/207

(Continued)

OTHER PUBLICATIONS

Rudolph, Peter K.C., *Mechanical Design of High Lift Systems for High Aspect Ratio Swept Wings*, NASA/CR-1998-196709, Feb. 1998.

*Primary Examiner* — Philip J Bonzell
(74) *Attorney, Agent, or Firm* — Nixon & Vanderhye P.C.

(57) ABSTRACT

There is described an aerodynamic surface drive mechanism (20) containing at least a drive combination (50, 50'), each drive combination (50, 50') comprising a fixed element (21) associated to a fixed aircraft structure and a first mobile component (22) connected pivotably by a first end to the fixed element (21) by way of an articulation axis (E) and associated to an actuator (30) by an opposite end, the aerodynamic surface drive mechanism (20) further comprises a second mobile component (23) rotationally associated to the first mobile component (22) by way of primary swivel joints (24, 24') linearly disposed along a vertical axis (Y) and rotationally connected to the aerodynamic surface (40) by way of secondary swivel joints (25, 25') linearly disposed along a horizontal axis (Z); the first mobile component (22) and the second mobile component (23) simultaneously moving the aerodynamic surface (40) linearly and rotatively by means of the actuator (30) and of the primary swivel joints (24, 24') and secondary swivel joints (25, 25').

7 Claims, 5 Drawing Sheets

(51) Int. Cl.
 *B64C 9/02* (2006.01)
 *B64C 9/16* (2006.01)

(56) References Cited

U.S. PATENT DOCUMENTS

| | | | | |
|---|---|---|---|---|
| 4,448,375 A | * | 5/1984 | Herndon | B64C 9/16 244/215 |
| 4,715,567 A | * | 12/1987 | Poccard | B64C 9/16 244/129.1 |
| 4,789,119 A | * | 12/1988 | Bellego | B64C 13/36 244/213 |
| 4,995,575 A | * | 2/1991 | Stephenson | B64C 9/16 244/216 |
| 5,230,487 A | * | 7/1993 | Gartelmann | B64C 9/16 244/216 |
| 7,500,641 B2 | * | 3/2009 | Sakurai | B64C 9/16 244/215 |

* cited by examiner

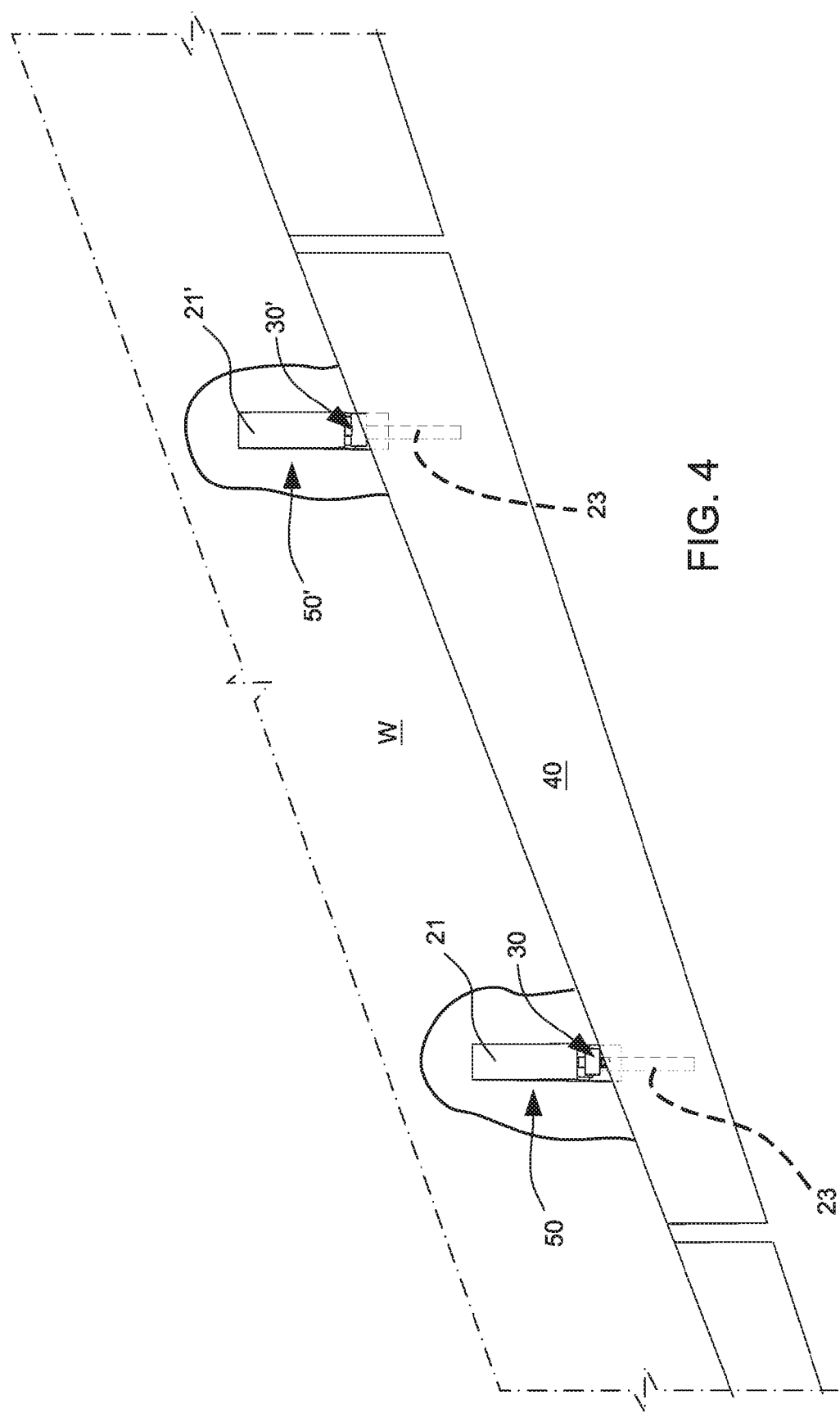

US 9,540,095 B2

AERODYNAMIC SURFACE DRIVE MECHANISM

FIELD

The present invention pertains to mechanisms for driving aerodynamic surfaces, preferably the flaps disposed on the aircraft wings.

BACKGROUND

Various types of drive mechanisms and aerodynamic surface support, especially the flaps of aircraft wings, are known in the state of the art.

In this sense, mechanisms of the "simple hinge" kind are used for driving aerodynamic surfaces such as, for instance, the flaps, when they are driven and moved in the perpendicular direction to the trailing edges of the wings (movement Chordwise).

When it is desirable to move the flaps in a direction parallel to the flight direction (Streamwise movement), other mechanisms are known and used such as, for instance, the "roller track", "combined hinges", "four-bar" mechanism, among others.

However, these already known aerodynamic surface drive mechanisms present flaws, such as the lack of robustness, localized wear and tear and high number of parts in the case of the "roller track" mechanism, impossibility of driving in a Streamwise movement when the "simple hinge" mechanism is used.

The movement of the flaps in a direction parallel to the flight direction (Streamwise movement) is often preferred because it diminishes drag compared to the movement of the flaps in a direction perpendicular to the trailing edges of the wings (Chordwise movement). However, the sweeping of the aircraft wings, required by the high speed of the modern jets, requires an aerodynamic surface drive mechanism such as flaps that enable the "Fowler" movement when the flap is driven. The "Fowler" movement is characterized by an initial horizontal movement, followed by a rotation.

Thus, further in relation to drive mechanisms already known in the state of the art, document U.S. Pat. No. 4,448,375 refers to a device for trailing flaps formed by a four-bar mechanism with the use of "swing-link" and rotary actuators to perform the "Fowler" movement when the flap is driven. The drawback of using "swing-link" in this movement lies in the increase of loads in the mechanism combination and flap panel when it is slanted on the plane transversal to the aircraft. Additionally, the "swing-link" provides a greater degree of freedom, whereby introducing more leeway in the flap mechanism, adversely affecting the robustness of the combination.

The "Layout" document published in *Mechanical Design of High Lift Systems for High Aspect Ratio Swept Wings* (Rudolph, P.—NASA 1998) illustrated in FIG. 1 shows a flap drive mechanism that uses, as indicated in the drawing, the principle of the "simple hinge", with a rotary actuator and "swing-link". Although this mechanism enables the flaps to be driven streamwise, this movement is made by way of the rotary actuator 1 fixed to the structure of the aircraft, in this case a wing, a spherical joint 2 disposed on the flap and a rod 3 acting as "swing-link" which is a rod privotable at its ends, between the mechanism and the flap, used to transfer loads exclusively in the direction parallel to the axis formed by these ends.

One objective of the present invention is to provide a robust mechanism, that is, without problematic elements such as rails or "swing-link" for driving aerodynamic surfaces moving them in a direction parallel to the flight direction (Streamwise movement).

SUMMARY

The object of the invention is an aerodynamic surface drive mechanism containing at least a drive combination, each drive combination comprising a fixed element associated to a fixed aircraft structure and a first mobile component connected pivotably by a first end to the fixed element by way of an articulation axis and associated to an actuator at an opposite end, the aerodynamic surface drive mechanism further comprises a second mobile component rotationally associated to the first mobile component by way of primary swivel joints linearly disposed along a vertical axis and rotationally connected to the aerodynamic surface by way of secondary swivel joints linearly disposed along a horizontal axis; the first mobile component and the second mobile component simultaneously moving the aerodynamic surface linearly and rotatively by means of the actuator and of the primary swivel joints and secondary swivel joints.

BRIEF DESCRIPTION OF THE DRAWINGS

The present invention will next be described in greater detail based on a sample execution represented in the drawings. The drawings show:

FIG. 4 is an enlarged top plan view of the aerodynamic surface drive mechanism and aerodynamic surface employed with the aircraft wing shown in FIG. 1*b* which is depicted with the aerodynamic surface in a stowed or retracted condition.

DETAILED DESCRIPTION

Figure 1A:
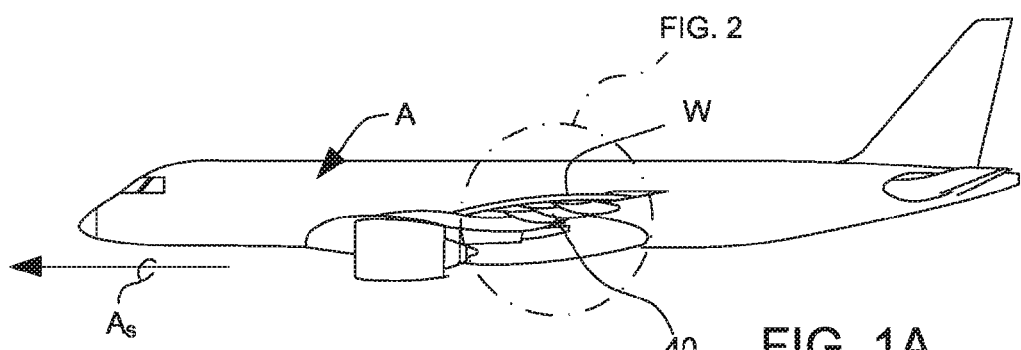
FIGS. 1*a*-1*c* are side, top plan and rear views, respectively of an aircraft provided with an aerodynamic surface flap and an embodiment of an aerodynamic surface drive mechanism that is the object of this invention.
Figure 1B:
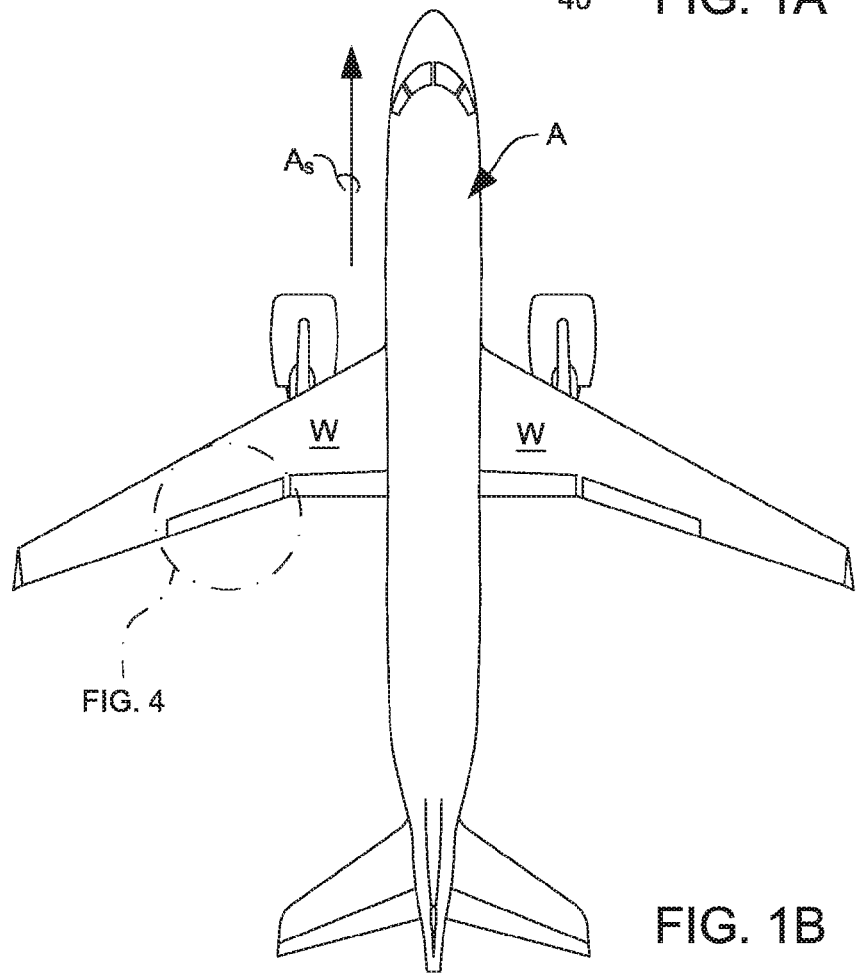
Figure 1C:
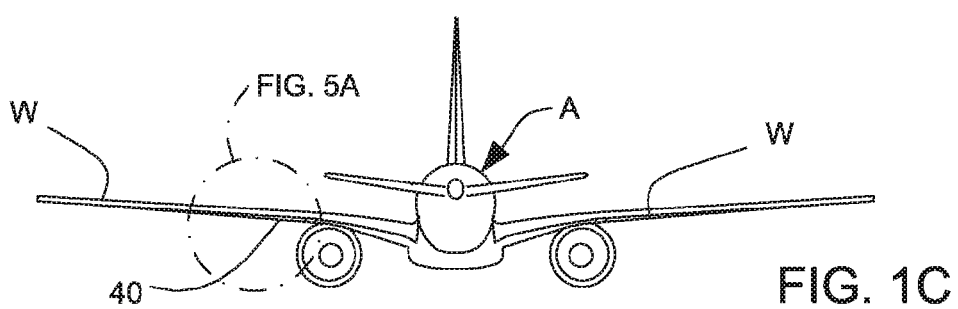

As can be seen in FIGS. 1*a*-1*c*, the aerodynamic surface drive mechanism 20 according to an embodiment of this invention is used for moving aerodynamic surfaces 40 such as, for instance, the flaps, in movements parallel to the flight direction of the aircraft A, i.e., a movement also known as "streamwise" movement shown by arrow $A_s$ in FIGS. 1*a* and 1*b*.

Figure 2:
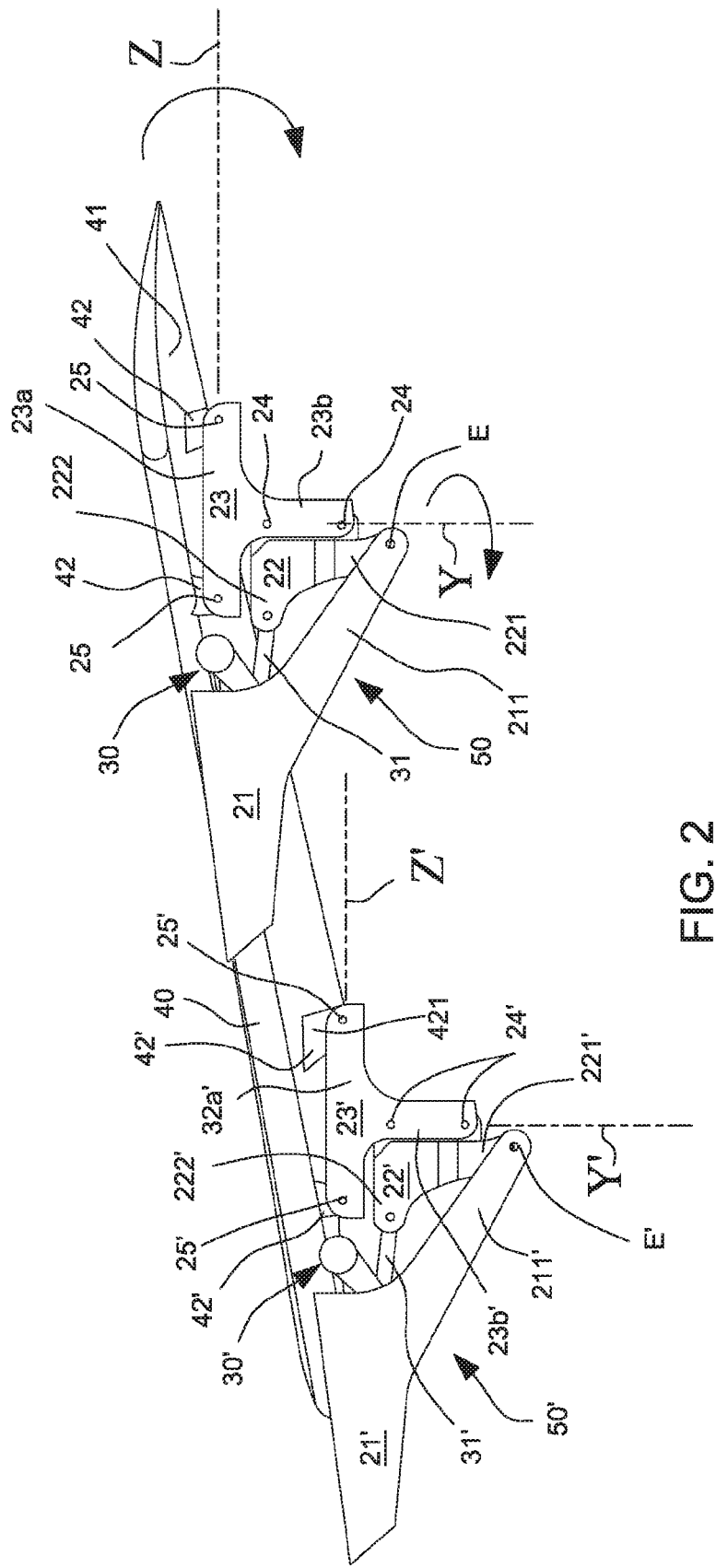
FIG. 2 is a front perspective view of the aerodynamic surface drive mechanism and aerodynamic surface employed with the aircraft wing shown in FIGS. 1*a*-1*c*.

To enable the streamwise movement of the aerodynamic surfaces 40, in particular the flaps of aircraft with swept wings, the aerodynamic surface drive mechanism 20 comprises at least one and preferably a pair of drive combinations 50, 50' associated with the aircraft A parallel to each other (see FIG. 2).

As can be seen in FIG. 2, each drive combination 50, 50' comprises a fixed element 21 associated to a fixed aircraft structure, for instance, a structure of the wing W of the aircraft among other possible structures. The fixed element 21, 21' is provided with an articulation end 211, 211' that includes an articulation axis E, E'. A first end 221, 221' of a first mobile component 22, 22' is connected pivotally to the fixed element 21, 21' at the articulation axis E, E'. A second end 222, 222' of the first mobile component 22, 22' is operatively connected to an actuator 30, 30'. The actuator 30, 30' includes a linear actuator which is fixed to the fixed aircraft structure, on the fixed element 21, 21' and connects to the first mobile component 22, 22' by way of an actuator rod 31, 31'.

A second mobile component 23, 23' is rotationally connected to the first mobile component 22, 22' by way of primary swivel joints 24, 24' linearly aligned along a vertical axis Y, Y' and rotationally connected to the aerodynamic surface 40 by way of secondary swivel joints 25, 25' linearly aligned along a horizontal axis Z, Z'.

This second mobile component 23, 23' is preferably T-shaped, such that the primary swivel joints 24, 24' are linearly aligned on the vertical tail piece portion 23b, 23b' of the second mobile component 23, 23' whereas the secondary swivel joints 25, 25' are linearly aligned on the horizontal cap piece portion 23b of the second mobile component 23. The vertical tail piece and horizontal cap piece portions 23a, 23a' and 23b, 23b', respectively, of the second mobile component 23, 23' as well as the vertical axes Y, Y' and the horizontal axes Z, Z' are preferably perpendicular to one another.

Accordingly, the vertical tail piece portion 23b, 23b' of the second mobile element 23, 23' is operatively connected to the first mobile element 22, 22' by way of the primary swivel joints 24, 24' that enable the rotation of the second mobile element 23, 23' around the Y, Y' axes, respectively, without being detached from the first mobile element 22, 22'. The horizontal cap piece portion 23a, 23a' of the second mobile element 23, 23' is operatively connected to a lower face 41 of the aerodynamic surface 40, e.g., by means of articulation structures 42, 42' fixed to the lower face 41. As such, the secondary swivel joints 25, 25' are housed by the articulation structures 42, 42', respectively, so as to permit a small pivotal rotation of the second mobile element 23, 23' around the Z axes, e.g., pivotal rotations less than 16 degrees.

Figure 3:
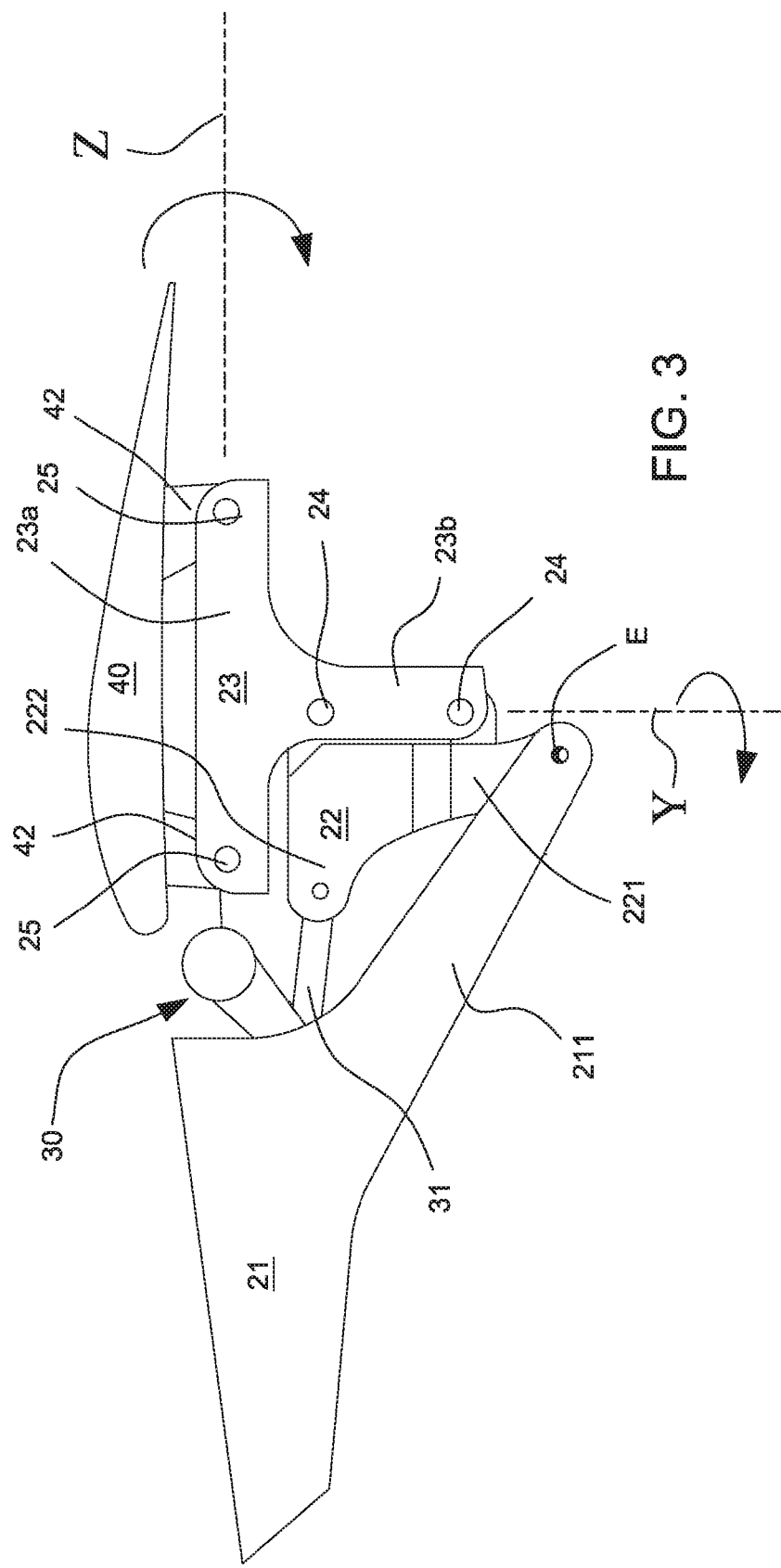
FIG. 3 is an enlarged detailed side elevational view of the aerodynamic surface drive mechanism and aerodynamic surface employed with the aircraft wing shown in FIGS. 1*a*-1*c*.
Figure 5A:
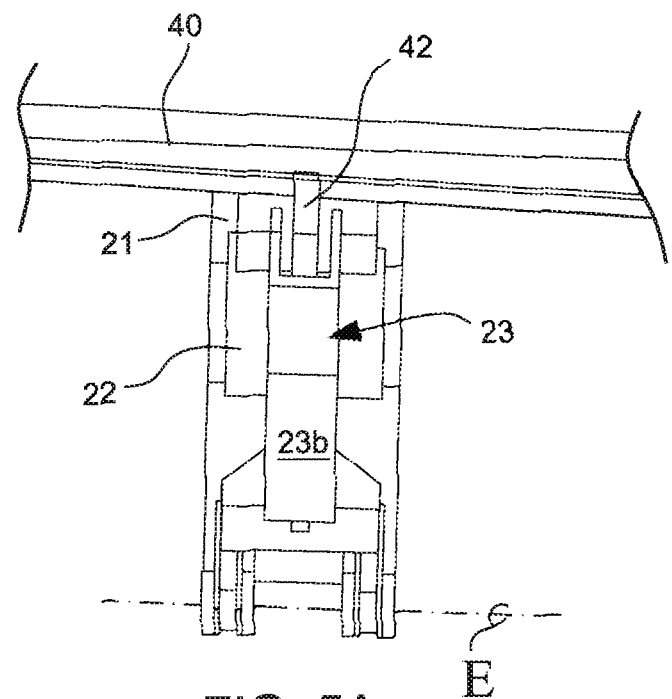
FIGS. 5*a* and 5*b* are enlarged rear elevational views of the aerodynamic surface drive mechanism and aerodynamic surface employed with the aircraft wing shown in FIG. 1*c* depicted with the aerodynamic surface in a stowed condition and a deployed condition, respectively.
Figure 5B:
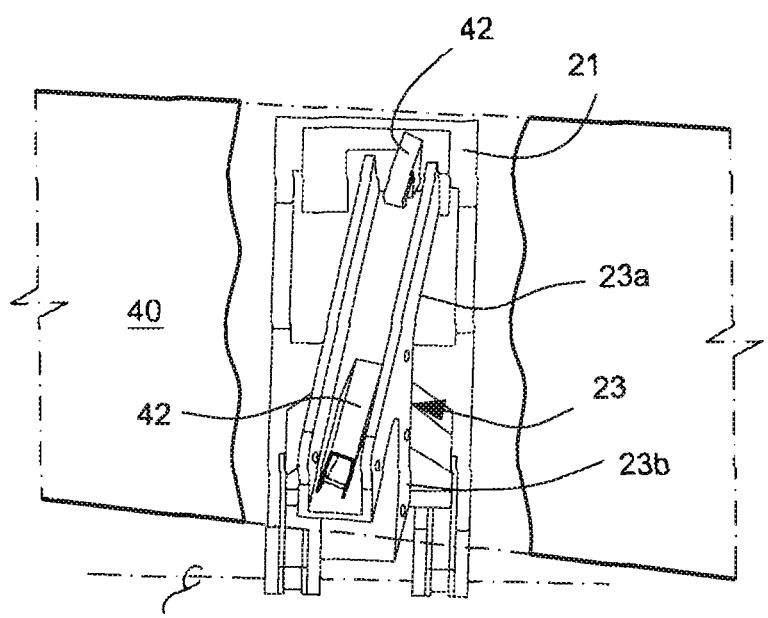

As can be seen, e.g., in FIGS. 3 and 4, the first mobile component 22, 22' is driven by the actuator 30, 30' so as to rotationally move the first mobile component 22, 22' about the articulation axes E, E' relative to the fixed element 21, 21'. This first mobile component 22, 22' will therefore responsively carry the second mobile component 23, 23' which thus moves in a main rotary movement about the articulation axes E, E' with the accompanying rotation of the first mobile component 22, 22'. The second mobile element 23, 23' in turn carries the aerodynamic surface 40 by means of its connection to the articulation structures 42, 42' fixed to the lower face 41 of the aerodynamic surface 40 thereby moving the aerodynamic surface linearly.

However, simultaneously with the rotary movement of the second mobile component 23, 23' and the accompanying pivotal movement of the first mobile component 22, 22' about the articulation axes E, E', respectively, the second mobile component 23, 23' will also sustain rotation around the Y axes relative to the first mobile component 22, 22' by means of the interconnection of the tail piece 23b, 23b' of the second mobile component 23, 23' and the first mobile component 22, 22' with the primary swivel joints 24, 24'. Thus, while the second mobile component 23, 23' moves the aerodynamic surface 40 linearly in response to pivotal movement of the first mobile component about the articulation axes E, E', respectively, the second mobile component 23, 23' will also move the aerodynamic surface 40 rotationally about the horizontal axes Z, Z', respectively, e.g., rotational movements of less than 16 degrees, such that the aerodynamic surface 40 is displaced in a direction parallel to the flight direction $A_s$ of the aircraft A.

The primary swivel joints 24, 24' of the first mobile component 22, 22' in conjunction with the secondary swivel joints 25, 25', of the second mobile component 23, 23' thereby enable the flap rotation to be housed following an axis that is not parallel to the wingspan of the flap (spherical joint effect). These rods are required due to the sweeping of the wing and dispense with the use of rod "swing links" known in the art, resulting in a structurally-robust aerodynamic surface drive mechanism which is also lighter on account of the lesser number of parts. This advantage is essential for aviation, the main objective of which is to reduce the weight of the aircraft, and also enables a reduction in industrial costs.

Additionally, the aerodynamic surface drive mechanism that is the object of this invention enables the "streamwise" movement in a swept wing, guaranteeing improved aerodynamic performance of the aircraft.

Having described an example of a preferred embodiment, it should be understood that the scope of the present invention encompasses other possible variations, being limited solely by the content of the accompanying claims, potential equivalents included therein.

The invention claimed is:

1. An aircraft comprising:
   an aerodynamic surface which is moveable between stowed and deployed conditions relative to fixed aircraft structure, and
   a drive mechanism connected operatively to the aerodynamic surface to drive the aerodynamic surface between the stowed and deployed conditions thereof, wherein the drive mechanism comprises:
   (i) a fixed element having an attachment end, the fixed element being immovably associated with the fixed aircraft structure;
   (ii) a first mobile component having first and second opposed ends, wherein the first mobile component is connected pivotally to an attachment end to the fixed element by way of an articulation axis;
   (iii) an actuator which is operable to move between extended and retracted positions, the actuator being connected pivotally to the second end of the first mobile component;
   (iv) a T-shaped second mobile component having a substantially horizontal cap piece defining a substantially horizontal axis and a substantially vertical tail piece fixed to and extending downwardly from the cap piece defining a substantially vertical axis perpendicular to the substantially horizontal axis;
   (v) primary swivel joints rotationally connecting the first mobile component to the tail piece of the second mobile component, the primary swivel joints being linearly aligned along the substantially vertical axis to allow pivotal movements of the second mobile component relative to the first mobile component about the substantially vertical axis;
   (vi) secondary swivel joints rotationally connecting the cap piece of the second mobile component to the aerodynamic surface, the secondary swivel joints being linearly aligned along the substantially horizontal axis to allow pivotal movements of the second mobile component relative to the aerodynamic surface about the substantially horizontal axis; wherein the first mobile component and the second mobile component simultaneously move the aerodynamic surface linearly and rotationally in response to the actuator moving between the retracted and extended positions thereof due to the pivotal interconnections of the primary and secondary swivel joints allowing simultaneous pivotal movements of the second mobile component about the substantially vertical axis and the substantially horizontal axis, respectively.

2. The aircraft as claimed in claim 1, wherein the aerodynamic surface comprises fore and aft articulation structures fixed to and extending downwardly from a lower face thereof, wherein the fore and aft articulate structures include a respective one of the secondary swivel joints connected to the cap piece of the second mobile component.

3. The aircraft as claimed in claim 1, wherein the aerodynamic surface is moveable between the stowed and deployed conditions in a direction that is substantially parallel to flight direction of the aircraft.

4. The aircraft as claimed in claim 3, wherein the aerodynamic surface comprises a flap that is moveable between stowed and deployed conditions relative to a fixed wing of the aircraft.

5. A drive mechanism for driving a moveable aerodynamic surface relative to a fixed aerodynamic surface of an aircraft, the drive mechanism comprising:
   a first mobile component having first and second opposed ends, wherein the first mobile component is connectable pivotally at the first end thereof to fixed structure of the fixed aerodynamic surface of the aircraft to permit pivotal movement of the first mobile component about an articulation axis;
   an actuator connected pivotally to the second end of the first mobile component and operable to pivotally move the first mobile component about the articulation axis between extended and retracted positions thereof;
   a second mobile component comprised of a T-shaped structure having a substantially horizontal cap piece which defines a substantially horizontal axis and a substantially vertical tail piece fixed to and extending downwardly from the cap piece which defines a substantially vertical axis perpendicular to the substantially horizontal axis;
   a pair of primary swivel joints rotationally connecting the first mobile component to the tail piece of the second mobile component, the pair of primary swivel joints being linearly aligned along the substantially vertical axis to allow pivotal movements of the second mobile component relative to the first mobile component about the substantially vertical axis;
   a pair of secondary swivel joints rotationally connecting the cap piece of the second mobile component to the aerodynamic surface, the secondary swivel joints being linearly aligned along the substantially horizontal axis to allow pivotal movements of the second mobile component relative to the aerodynamic surface about the substantially horizontal axis; wherein
   the first mobile component and the second mobile component simultaneously move the aerodynamic surface linearly and rotationally in response to the actuator moving between the retracted and extended positions thereof due to the pivotal interconnections of the primary and secondary swivel joints allowing simultaneous pivotal movements of the second mobile component about the substantially vertical and horizontal axes, respectively.

6. The drive mechanism as claimed in claim 5, wherein the aerodynamic surface comprises fore and aft articulation structures fixed to and extending downwardly from a lower face thereof, wherein the fore and aft articulate structures include a respective one of the secondary swivel joints connected to the cap piece of the second mobile component.

7. An aircraft comprising a fixed wing and an aerodynamic flap moveable between stowed and deployed conditions relative to the fixed wing, wherein the aircraft further comprises a drive mechanism according to claim 5 for driving the aerodynamic flap between the stowed and deployed conditions thereof.

* * * * *